(12) United States Patent
Staller et al.

(10) Patent No.: US 6,526,230 B2
(45) Date of Patent: Feb. 25, 2003

(54) COMPACT PHOTOGRAPHIC APPARATUS OF THE SELF-DEVELOPING TYPE

(75) Inventors: Norman D. Staller, Beverly, MA (US); Frank A. Nado, Norwood, MA (US)

(73) Assignee: Polaroid Corporation, Waltham, MA (US)

( * ) Notice: Subject to any disclaimer, the term of this patent is extended or adjusted under 35 U.S.C. 154(b) by 0 days.

(21) Appl. No.: 09/952,549

(22) Filed: Sep. 14, 2001

(65) Prior Publication Data

US 2002/0076216 A1 Jun. 20, 2002

Related U.S. Application Data

(60) Provisional application No. 60/233,003, filed on Sep. 15, 2000.

(51) Int. Cl.[7] .............................................. G03B 17/50
(52) U.S. Cl. ........................................ 396/30; 396/536
(58) Field of Search ............................ 396/30, 536, 34, 396/351

(56) References Cited

U.S. PATENT DOCUMENTS

| | | | | | |
|---|---|---|---|---|---|
| 3,151,536 | A | * | 10/1964 | Raitt | 396/536 |
| 3,440,941 | A | * | 4/1969 | Linder | 396/30 |
| 3,839,607 | A | | 10/1974 | Ogilhara | 200/33 R |
| 4,064,518 | A | * | 12/1977 | Douglas | 396/34 |
| 4,797,697 | A | * | 1/1989 | Heuer et al. | 396/535 |
| 5,001,502 | A | * | 3/1991 | Douglas | 396/34 |
| 5,608,477 | A | * | 3/1997 | Shimizu et al. | 396/6 |
| 5,721,963 | A | * | 2/1998 | Iwagaki et al. | 396/6 |
| 5,867,742 | A | * | 2/1999 | Salvas et al. | 396/263 |
| 5,870,633 | A | | 2/1999 | Norris | 396/33 |
| 6,055,375 | A | * | 4/2000 | Douglas et al. | 396/33 |
| 6,099,172 | A | | 8/2000 | Togashi | 396/502 |
| 6,276,846 | B1 | * | 8/2001 | Williams et al. | 396/415 |

* cited by examiner

Primary Examiner—David M. Gray
Assistant Examiner—Michelle Nguyen

(57) ABSTRACT

A compact camera for producing images on self-developing film, said camera comprising an assembly including a light-tight main frame, a first housing member, and a second housing member; wherein said assembly is arranged to minimize the height of said camera.

13 Claims, 5 Drawing Sheets

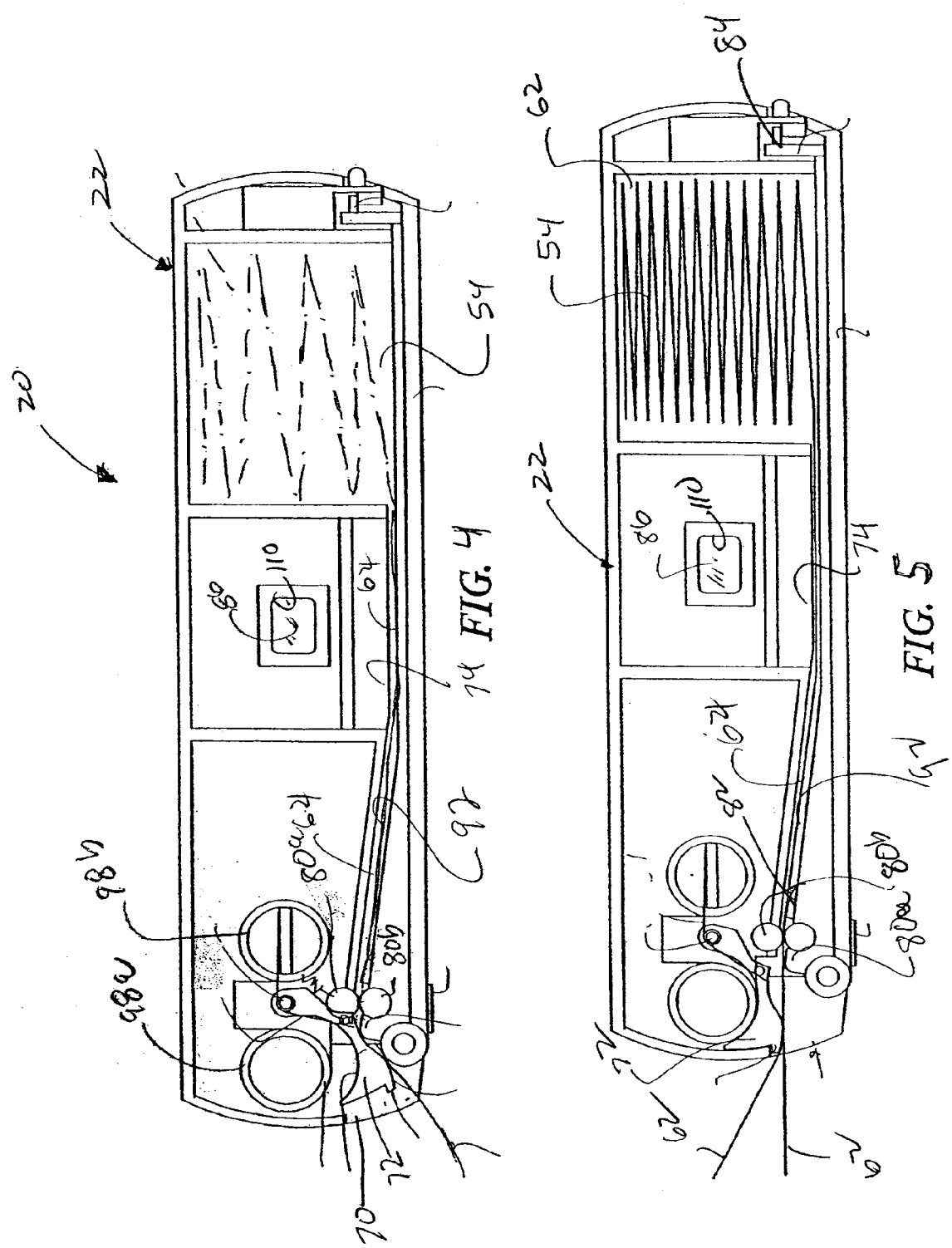

COMPACT PHOTOGRAPHIC APPARATUS OF THE SELF-DEVELOPING TYPE

PRIORITY DATE

The present application claims the priority date benefit of the provisional case entitled "Compact Photographic Apparatus of the Self-Developing Type", which has serial number 60/233,003, and was filed on Sep. 15, 2000.

BACKGROUND

The present invention relates generally to compact photographic apparatus and, more particularly, to simplified compact cameras of the self-developing type.

The prior art is characterized by numerous efforts to make photographic cameras of the self-developing type both simplified and compact. These efforts include photographic cameras, such as described in U.S. Pat. No. 5,870,633 issued to Norris and U.S. Pat. No. 6,099,172 issued to Togashi et al; both of which are commonly-assigned to Polaroid Corporation. Both types of cameras relate to simplified mechanisms cooperating with a strip film assemblage of the self-developing type. The interconnected film frames are sequentially exposed, indexed, processed, and singulated as they are pulled from the camera. These cameras are compact in configuration, and simplified in construction and operation.

Despite the existence of these known approaches, however, there is nevertheless a continuing desire to make improvements in the overall ease and reliability of their operation as well as simplification and compactness of the camera construction, while retaining optimal system performances.

OBJECTS OF THE PRESENT INVENTION

It is an object of the present invention to provide a camera of the self-developing type that is compact in its architecture and simplified in operation.

It is an object of the present invention to provide a camera of the self-developing type that has a compact architecture and yet is highly reliable in operation.

It is an object of the present invention to provide a camera of the self-developing type that has a compact architecture and yet is highly reliable in operation without any loss in performance.

It is an object of the present invention to provide a camera of the self-developing type that has a compact architecture and yet is relatively economical to manufacture and assemble.

It is an object of the present invention to provide for a simplified camera that is user friendly and reliable in operation; particularly for young and inexperienced camera operators.

Other objects and further scope of applicability of the present invention will become apparent after reading a detailed description when taken in conjunction with the accompanying drawings wherein like reference numerals indicate like structure throughout the several views.

BRIEF DESCRIPTION OF THE DRAWINGS

FIG. 4 is a schematic elevation view illustrating several of the operating components in the interior of the camera.

FIG. 5 is a schematic elevation view illustrating several of the operating components of the interior of the camera.

DETAILED DESCRIPTION

Figure 1:
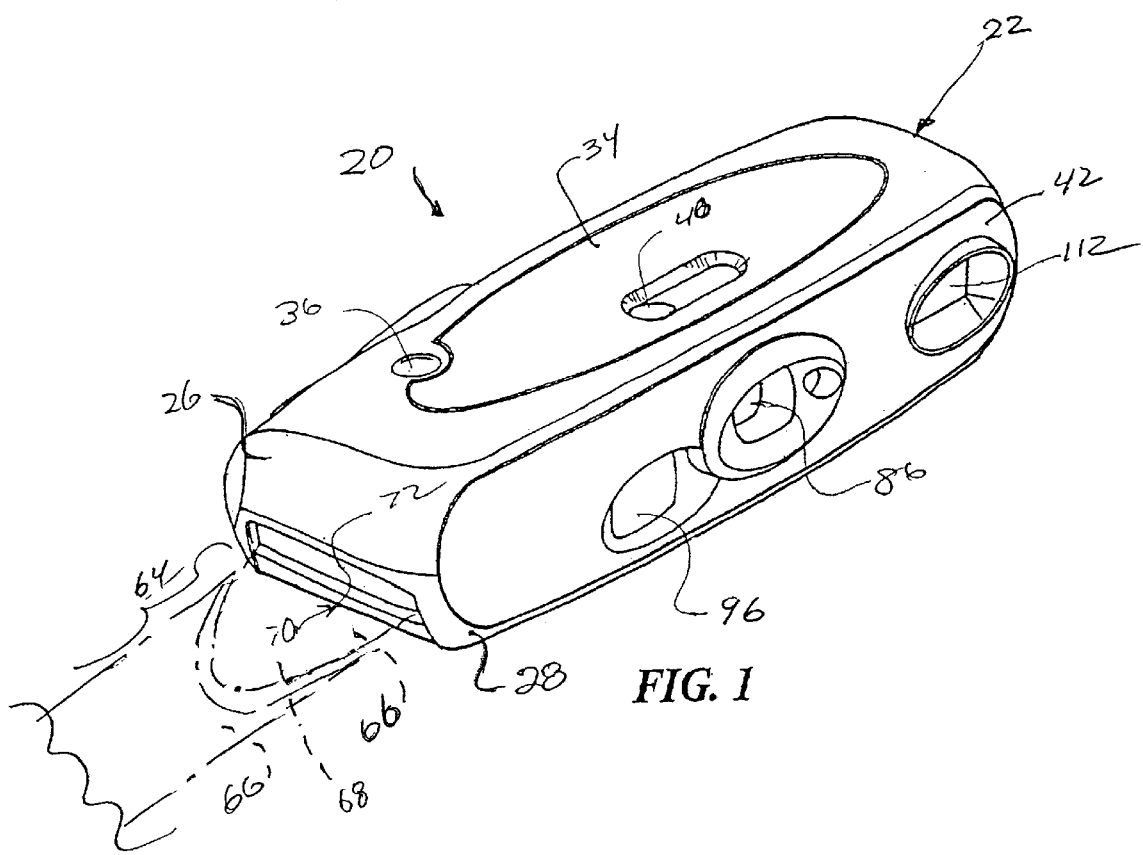
FIG. 1 is a perspective view of a self-developing camera embodying features of the present invention
Figure 2:
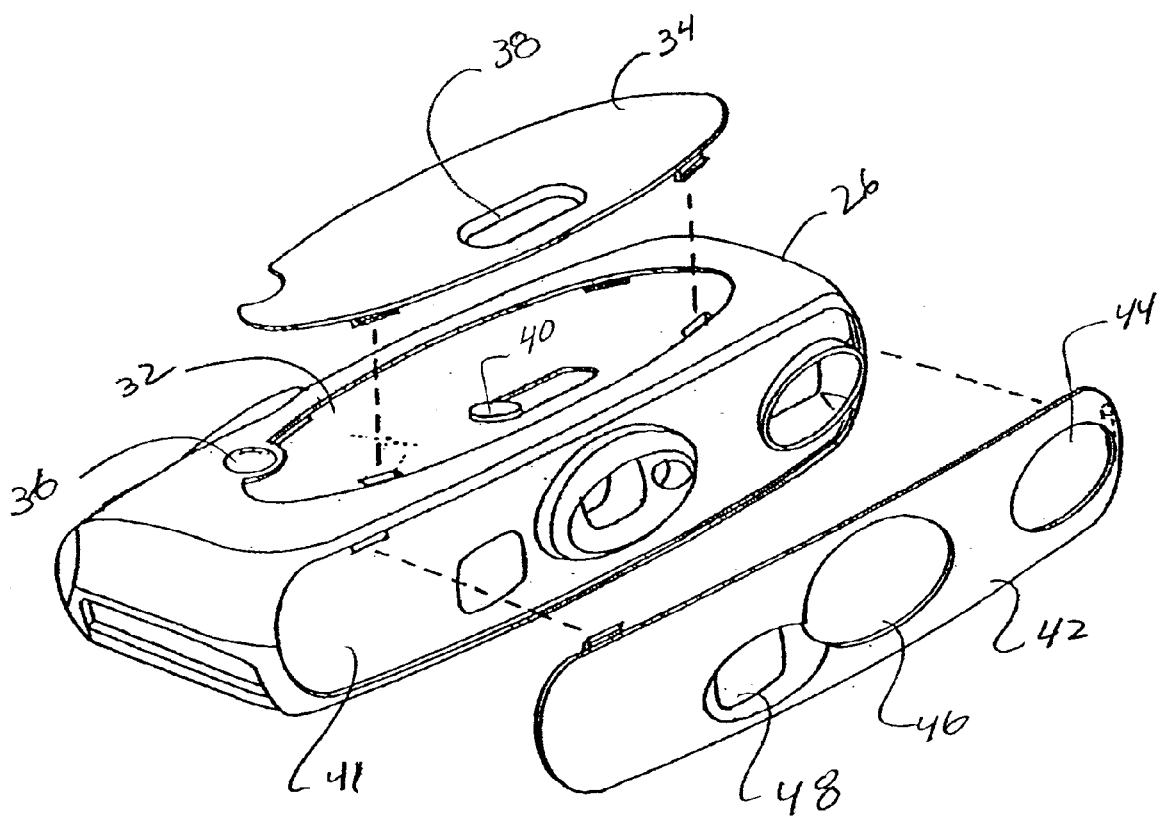
FIG. 2 is a partially exploded perspective view of the camera illustrating removable and decorative panels.
Figure 3:
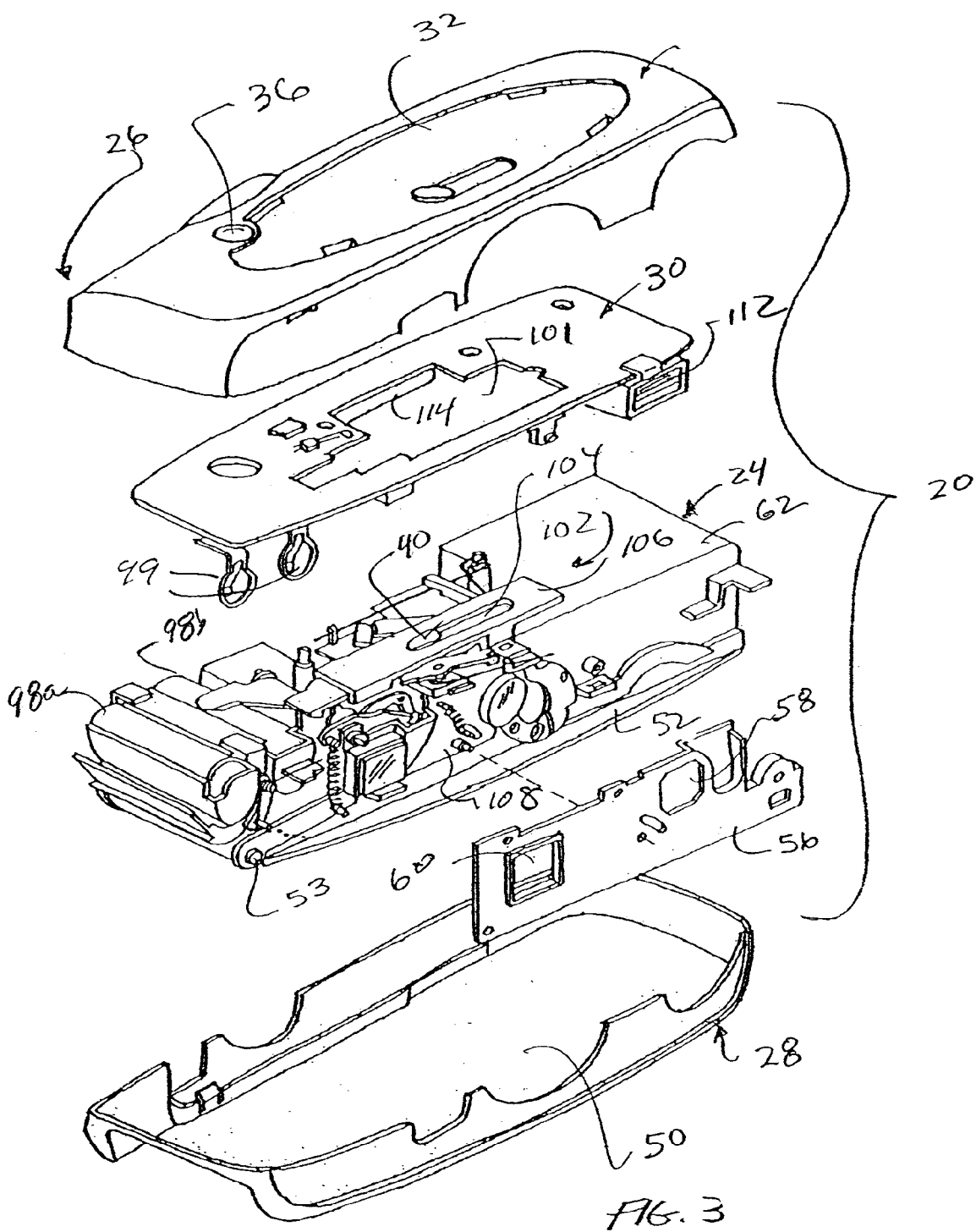
FIG. 3 is an exploded perspective view illustrating several subassemblies of the camera.

Reference is made to FIGS. 1–6 for illustrating one preferred embodiment of a compact camera 20 of the self-developing type that is made in accordance to the principles of the present invention. Included in the camera 20 is a housing assembly 22 that essentially comprises a light-tight main frame assembly 24, an upper casing shell or member 26, a lower casing shell or member 28, and an electrical strobe board 30 that carries the electrical components for operation of the camera.

The upper casing member 26 defines an elliptical recess 32 for accommodating in a generally flush relationship thereto a decorative and removable top panel 34 that a user can replace in order to change styling of the camera. The decorative top panel 34 is latched to the upper casing. The upper casing 26 has an opening for accommodating a shutter button 36 and an elongated slot 38 for an aperture selector tab 40.

The upper and lower casing members are suitably joined together to enclose the main frame assembly 24 and define an elliptical recess 41 in the front thereof for accommodating a decorative and replaceable front panel 42. The front panel 42 is latched to the housing assembly 22 so as to fit generally flush within the recess 41. The front panel 42 has a strobe opening 44, a taking lens opening 46, and a viewfinder opening 48.

The lower casing member 28 has an enlarged generally rectangular opening 50 sized for allowing a film loading door 52 to move pivotally between open and closed conditions. As a consequence, a film assembly is allowed to be inserted and removed.

Provision is made for a generally rectangular retaining plate 56 that has a taking lens aperture 58 and a viewfinder aperture 60 that is mounted on the main frame assembly 24 and is enclosed within the casing members 26, 28.

Reference is made back to the main frame assembly 24, wherein provision is made for a film box cavity 62 that is sized for removably receiving a film package (not shown) that stores the film assemblage 54. The film assemblage 54 is, preferably, of the self-developing kind that is particularly adapted for use in a camera of the above type. The film assemblage is similar in construction to those described in commonly-assigned U.S. Pat. Nos;: 5,838,999 and 5,888,693, and hence, the descriptions thereof are incorporated herein and made a part hereof. However, only those portions of the film assemblage 54 necessary to understand the present invention will be set forth herein. In this regard, the film assemblage is in the form of an elongated strip 64 with separable individual film frames 66 housed in a folded and stacked relationship within the film package or cassette. A leading tab 68 of each frame 66 is adapted to protrude from an exit slot 70 (FIG. 4) and a spring-biased film flap 72 is pivotally mounted adjacent one end of the camera housing, whereby an operator can grasp and pull the film assemblage for indexing the latter. The film flap does not, per se, form an aspect of the present invention. A detailed description thereof is described in the last noted patent application and is incorporated herein and made a part hereof. The film frames 66 are frangibly connected to each other, whereby they separate into individual frames when the film strip is pulled from the housing assembly. Thus, when an operator pulls on a leading tab 68 of an exposed film frame, the film is advanced thereby effecting processing of an exposed film unit as the latter is withdrawn from a focal plane 74 and passes through a nip defined by a pair of processing rollers 80a, b (FIG. 4). As a result, each of the emerging and distal end film frames separate from a successive film frame that has been simultaneously indexed from the film cavity which has its leading tab emerge.

Figure 6:
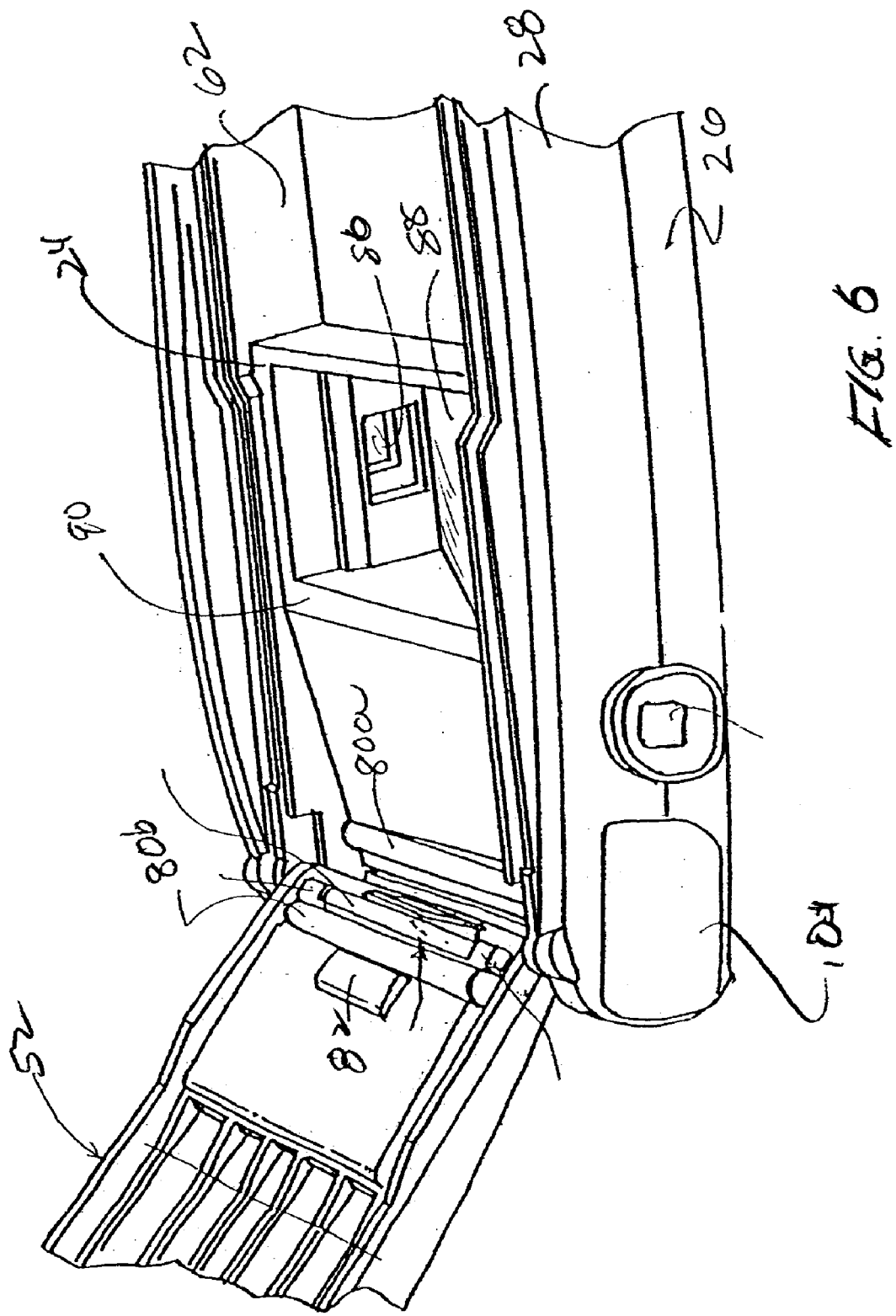
FIG. 6 is a perspective view of a partial portion of the camera in the open film loading condition.

Continued reference is to FIGS. 4–6 wherein the film loading door 52 is pivotally mounted to one end of the main frame housing assembly 24 adjacent a film flap. The spread roller 80a is mounted for rotation on the door 52 adjacent a pre-spread feature 82 that is mounted on the door immediately prior to a nip defined by and between the rollers 80a, b. A latch 84 is located at one end of the film loading door 52 and cooperates with a complementary catch for releaseably securing the door in a closed and light-tight relationship with the main frame assembly. The camera may also be used as a one-time use camera, whereby the door would be locked against customer opening and the film preloaded prior to being locked.

For defining the focal plane 74 there is provided a taking lens 86, a mirror 88, and a focal cone 90 defined by and at the bottom of the main housing assembly 24. The taking lens 86 is mounted by the retaining plate and is generally positioned to reduce the height of camera relative to the camera described in U.S. Pat. No. 6,099, 172. The taking lens 86 is positioned more laterally with respect to a longitudinal axis of the camera while retaining the same focal length as the taking lens in the noted patent. This relationship in turn lowers the mirror, thus reducing the height profile. The focal cone 90 is defined to accommodate the size format of the film. Adjacent the focal cone 90 is film path defining ramp 92 that serves to reduce the axial length, or height, of the camera. The spread roller 80b is spring biased and is mounted for rotation in the bottom wall of the main frame assembly 24. The spread roller 80b defines a nip with roller 80a whenever the loading door is in the closed condition. The viewfinder assembly 96 can be anyone of several kinds.

As illustrated, a pair of generally parallel battery receiving cavities 98a, 98b are mounted in close proximity to the viewfinder assembly 96 and the shutter button 96. The battery receiving cavities lie in a plane that includes the viewfinder assembly 96 for purposes of establishing a compact relationship. Batteries (not shown) engage with the battery contacts 99. A battery compartment door 100 is provided.

The horizontally mounted strobe board 30 has an aperture 101 that is configured to fit over and encompass a portion of the aperture selector mechanism 102. The aperture selector mechanism 102 does not, per se, form an aspect of the present invention. For a more detailed description thereof reference is made to copending U.S. patent application 60/223,958 which is incorporated herein and made a part hereof. Hence, only those components thereof necessary to understand the present invention will be described. The selector mechanism 102 includes an aperture selector slide 104 that is mounted for movement on the main frame assembly 24 and is manually displaced by an operator to one of several distinct aperture settings corresponding to, for example, iconographic information on the exterior of the housing. The selector slide 104 is housed and guided for movement by a retainer housing 106; both of which have their longitudinal axes generally parallel to the surface of the strobe board 30 and generally centrally disposed along the length of the camera so as to be above the taking lens. A shutter 108 is mounted on the main frame assembly and is interposed between the taking lens and an aperture 110 in the main frame assembly.

A flash tube assembly 112 is mounted on the strobe board 30 for use in generating artificial illumination to be directed at the scene depends from one end of the board. A capacitor 114 for energizing the flash tube assembly 112 is mounted on an underside surface of the strobe board 30 and has its axial extent extending along a bottom surface of the strobe board and generally parallel to such bottom surface.

What is claimed is:

1. A compact camera for producing images on self-developing film units, said camera comprising:
    a light-tight housing including oppositely spaced, substantially planar and parallel forward and rear walls;
    a film exposure station adjacent said rear wall for supporting a self-developing film unit at a film exposure plane;
    exposure means mounted on said forward wall for exposing a self-developing film unit at said exposure station;
    means, including a pair of opposed pressure rollers, for processing a self-developing film unit after exposure, said pressure rollers being mounted between said forward and rear walls to one side of said exposure station and being offset from said exposure plane toward said forward wall; and
    an inclined film guide ramp extending from said exposure station to said rollers at an angle to said forward and rear walls;
    wherein the placement of said rollers and said inclined film guide ramp allows the spacing between said forward and rear walls to be minimized to provide a compact housing.

2. The camera of claim 1 and further including a retaining plate for supporting a shutter and lens.

3. The camera of claim 1 wherein said light-tight housing contains a film door.

4. The camera of claim 1 and further including a printed circuit board having a printed circuit board aperture, said printed circuit board aperture located such that said printed circuit board tightly nests with said housing to further minimize said housing.

5. The camera of claim 1 wherein said exposure means includes at least a lens and a light-reflector, wherein said light-reflector is angled and positioned at a finite distance from said lens to further minimize said housing.

6. The camera of claim 1 and further including parallel battery receiving cavities mounted in close proximity to a viewfinder and shutter to further minimize said housing.

7. The camera of claim 1 wherein said housing includes a first area generally covering a top half portion of said housing.

8. The camera of claim 1 further comprising a film door hingedly disposed with said housing, said film door hingedly operable through a generally rectangular aperture in said housing.

9. The camera of claim 1 wherein at least one decorative panel is detachably disposed with said housing.

10. The camera of claim 1 wherein said housing includes a recessed portion shaped to insertably and detachably couple with a decorative panel.

11. The camera of claim 1 wherein said housing includes a second area generally covering a bottom half portion of said housing.

12. The camera of claim 11 wherein said bottom half portion of said housing defines an enlarged and generally rectangular aperture.

13. A method of producing images on self-developing film using a compact camera, said method comprising the steps of:

a) providing a camera according to claim 1; and b) actuating said camera to capture said image.

* * * * *